United States Patent [19]

Takano et al.

[11] 4,115,788

[45] Sep. 19, 1978

[54] COMPOUND MATRIX FORMATION IN AN INK JET SYSTEM PRINTER

[75] Inventors: Rikuo Takano, Musashino; Mitsushi Matsunaga, Tokorozawa; Yuhkichi Tsuchida, Akishima; Yuji Sumitomo, Nara; Ikuo Umeda, Kitakatsuragi; Masahiko Aiba, Nara, all of Japan

[73] Assignees: Nippon Telegraph and Telephone Public Corporation, Tokyo; Sharp Kabushiki Kaisha, Osaka, both of Japan

[21] Appl. No.: 683,964

[22] Filed: May 6, 1976

[30] Foreign Application Priority Data

May 8, 1975 [JP] Japan ................................ 50-55696

[51] Int. Cl.[2] ........................................ G01D 15/18

[52] U.S. Cl. .................................... 346/75; 400/126

[58] Field of Search ........................ 346/75; 197/1 R; 340/324 AD

[56] References Cited

U.S. PATENT DOCUMENTS

| | | | |
|---|---|---|---|
| 3,418,518 | 12/1968 | Reese | 340/324 XA D |
| 3,725,900 | 4/1973 | Ohmann | 340/324 A |
| 3,959,797 | 5/1976 | Jensen | 346/75 X |
| 4,050,077 | 9/1977 | Yamada et al. | 346/75 |
| 4,052,719 | 10/1977 | Hutt et al. | 340/324 AD |

FOREIGN PATENT DOCUMENTS

| | | | |
|---|---|---|---|
| 2,435,794 | 3/1975 | Fed. Rep. of Germany | 340/324 |

*Primary Examiner*—Joseph W. Hartary

*Attorney, Agent, or Firm*—Birch, Stewart, Kolasch and Birch

[57] ABSTRACT

A primary matrix pattern such as 5 × 7 matrix structure and an auxiliary matrix pattern such as 4 × 6 matrix structure are combined with each other in an ink jet system printer in such a manner that auxiliary dots contributing to the auxiliary matrix pattern are shifted in both column and row directions by a half dot position with respect to the primary matrix pattern. These auxiliary dots function to increase dot density along oblique lines in the dot matrix pattern.

8 Claims, 9 Drawing Figures

FIG. 4
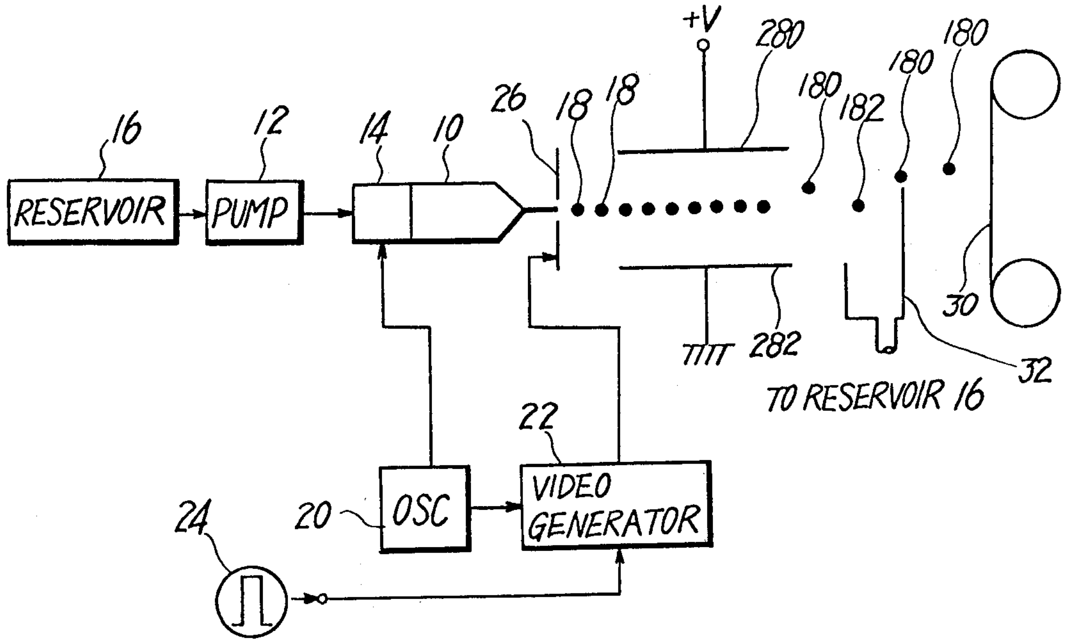
FIG. 6 (DATA SELECTOR -42-)
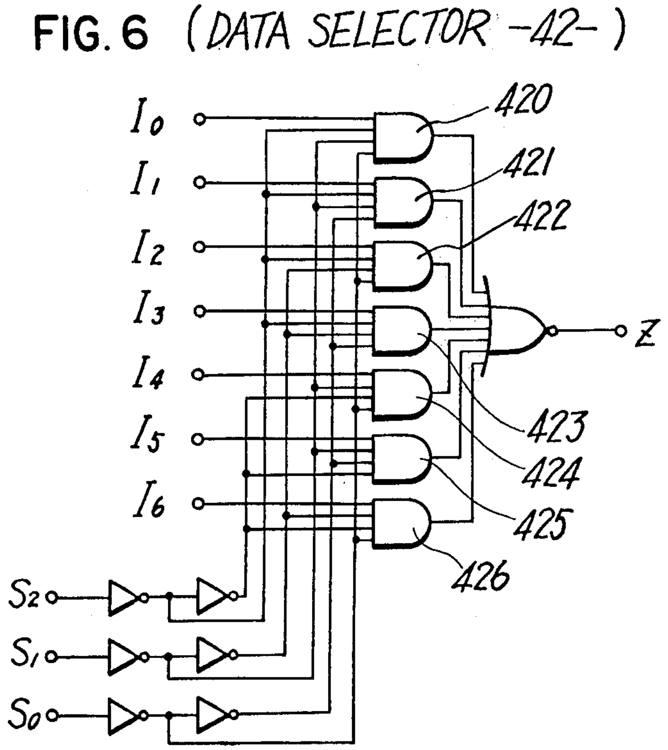

FIG. 5 (VIDEO GENERATOR -22-)
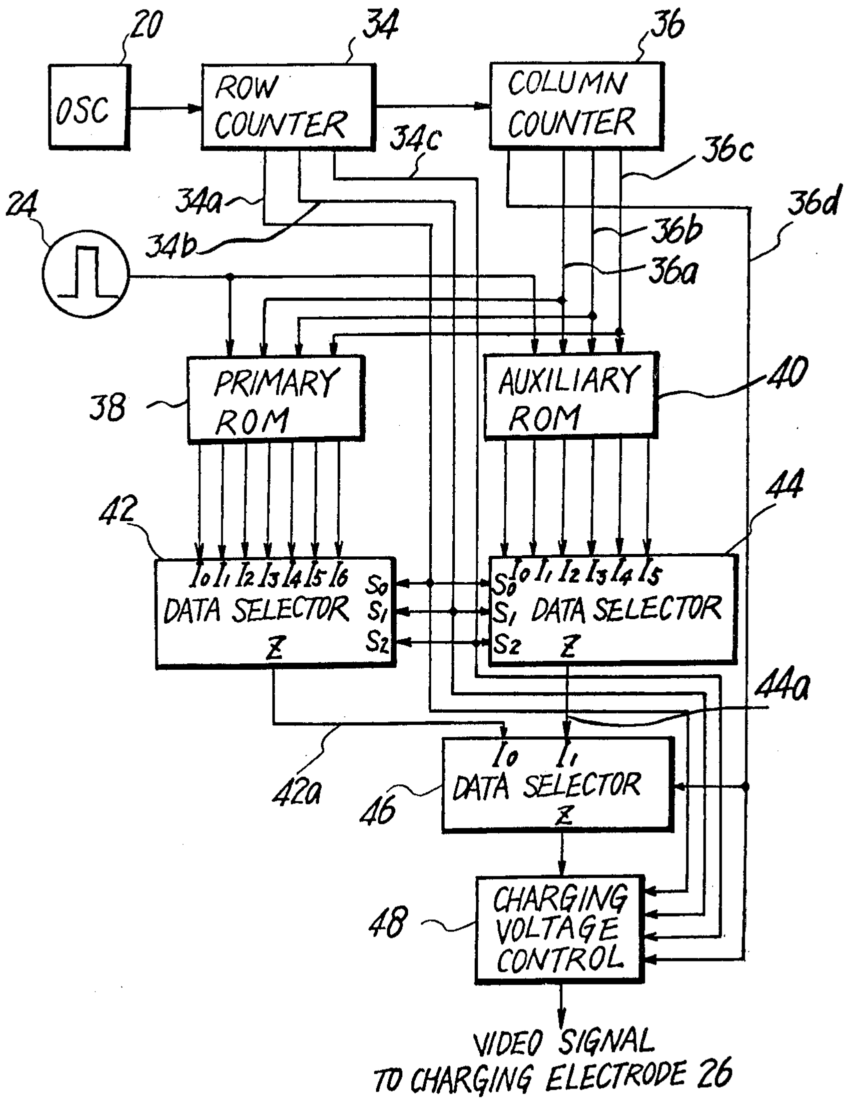

FIG. 8 (CHARGING VOLTAGE CONTROL -48-)
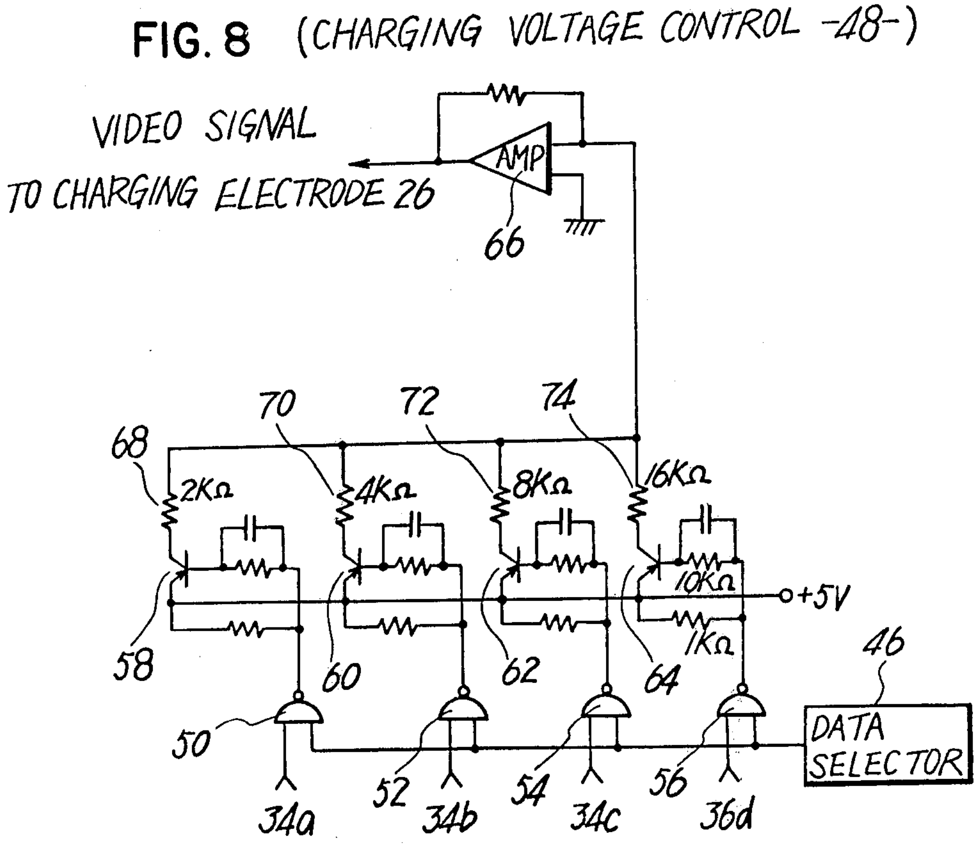
FIG. 7 (DATA SELECTOR -46-)
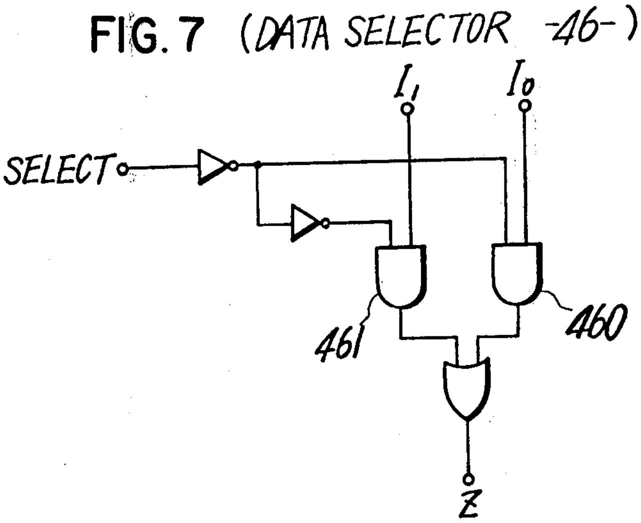

COMPOUND MATRIX FORMATION IN AN INK JET SYSTEM PRINTER

BACKGROUND OF THE INVENTION

The present invention relates to an ink jet system printer and, more particularly, to a print control for enhancing the print quality in an ink jet system printer.

Generally, in an ink jet system printer, a character pattern is formed in a 5 × 7 dot matrix structure or in a 7 × 9 dot matrix structure. In such a dot matrix structure, though it is not preferable, distance between two adjacent dots along oblique lines in the dot matrix pattern is unavoidably longer than distance between two adjacent dots along the lateral or vertical line in the dot matrix pattern. These differences of spacing between two adjacent dots reduce the visibility of the printed character.

To minimize the above defects, it has been proposed to increase the necessary number of dots constituting a dot matrix pattern to thereby reduce the spacing between two adjacent dots in the dot matrix pattern. However, the printing velocity becomes slow as the dot number required in the dot matrix pattern increases, or the dot size becomes unavoidably small as the dot number required in the dot matrix pattern increases, which also damages the visibility of the printed character. Moreover, even when the dot number required in the dot matrix pattern is increased, the distance between two adjacent dots along oblique lines in the dot matrix pattern is still longer than the distance between two adjacent dots along the lateral or vertical line in the dot matrix pattern.

OBJECTS AND SUMMARY OF THE INVENTION

Accordingly, an object of the present invention is to provide a novel print control in an ink jet system printer.

Another object of the present invention is to enhance the print quality in an ink jet system printer without substantially slowing down the printing velocity.

Still another object of the present invention is to provide a novel compound matrix structure suited for enhancing the visibility in an ink jet system printer.

Yet another object of the present invention is to provide a print control circuit suited for reducing the distance between two adjacent dots along oblique lines in a dot matrix pattern in an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, a primary matrix pattern such as 5 × 7 matrix structure and an auxiliary matrix pattern such as 4 × 6 matrix structure are combined with each other in such a manner that auxiliary dots contributing to the auxiliary matrix pattern are shifted in both column and row directions by a half dot position with respect to the primary matrix pattern. These auxiliary dots are positioned between two adjacent dots along oblique lines in the dot matrix pattern, thereby increasing dot density along oblique lines and functioning to enhance the visibility.

Such a shift operation can easily be achieved, in an ink jet system printer of the charge amplitude controlling type, by varying the charging voltage to be applied to a charging tunnel by a desired level corresponding to a half dot position, or, in an ink jet system printer of the deflection voltage controlling type, by varying the deflection voltage to be applied to two pairs of deflection plates by a desired level corresponding to a half dot position.

In a preferred form, a first read only memory for controlling the primary matrix pattern of 5 × 7 structure and a second read only memory for controlling the auxiliary matrix pattern of 4 × 6 structure are provided. Output signals of the first and second read only memories are exclusively selected through the use of a data selector and then applied to the charging tunnel via a charging signal generator, or applied to the two pairs of deflection plates via deflection voltage signal generators.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 4 is a schematic block diagram of an ink jet system printer of the charge amplitude controlling type including a video generator of the present invention;

FIG. 5 is a circuit diagram of the video generator of FIG. 4, which includes a first, second and third data selectors, and a charging voltage control circuit of the present invention;

FIG. 6 is a detailed circuit diagram of the first and second data selectors included within the video generator of FIG. 5;

FIG. 7 is a detailed circuit diagram of the third data selector included within the video generator of FIG. 5;

FIG. 8 is a detailed circuit diagram of the charging voltage control circuit included within the video generator of FIG. 5.

DESCRIPTION OF THE PREFERRED EMBODIMENT

Referring now in detail to the drawings, and to facilitate a more complete understanding of the present invention, a dot matrix pattern of 5 × 7 structure printed by an ink jet system printer of the prior art will be first described with reference to FIG. 1.

Figure 1:
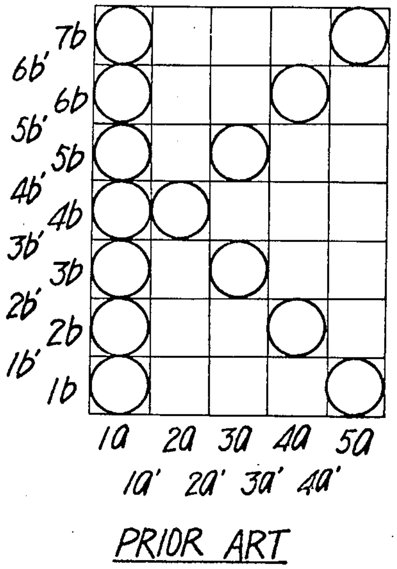
FIG. 1 is a schematic view showing a character pattern "K" printed by an ink jet system printer of the prior art.

FIG. 1 shows a character pattern "K" of 5 × 7 matrix structure. It is clear from FIG. 1 that the spacing between two adjacent dots along the oblique lines is considerably longer than that of along the vertical line in the dot matrix pattern.

To reduce the spacing between two adjacent dots along the oblique lines, in accordance with the present invention, auxiliary dots are provided between two adjacent dots along the oblique lines. That is, the auxiliary dots are deposited at the points (2*a*', 3*b*'), (2*a*', 40*b*'), (3*a*', 2*b*'), (3*a*', 5*b*'), (4*a*', 1*b*') and (4*a*', 6*b*').

Figure 2:
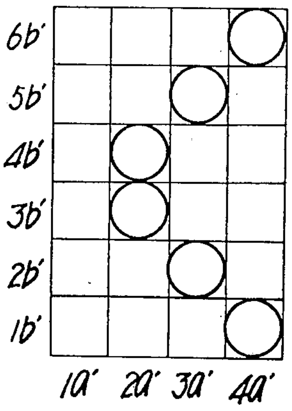
PRIOR ART FIG. 2
FIG. 2 is a schematic view showing an auxiliary matrix pattern of the present invention for the character "K"

FIG. 2 shows an auxiliary matrix pattern of 4 × 6 structure for use in printing the character "K". The auxiliary matrix pattern shown in FIG. 2 is combined with a primary matrix pattern of FIG. 1 as shown in FIG. 3.

Figure 3:
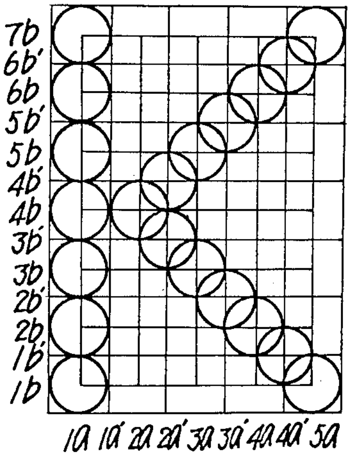
FIG. 3 is a schematic view showing a character pattern "K" printed by an ink jet system printer of the present invention.

It is clear from FIG. 3 that the spacing between two adjacent dots along oblique lines is reduced, and the visibility is considerably enhanced. The visibility of the character printed in compound matrix structure (5 × 7 combined with 4 × 6) of FIG. 3 is as good as or better than that printed in a matrix pattern of 9 × 13 structure even though the compound matrix structure of FIG. 3 requires only 59 matrix elements. The printing velocity is considerably high as compared with that required in 9 × 13 matrix structure, since the compound matrix pattern of FIG. 3 requires only 59 matrix elements.

A typical way for forming a compound matrix pattern in an ink jet system printer of the charge amplitude controlling type will be described hereinbelow.

Generally, referring now to FIG. 4, in an ink jet system printer of the charge amplitude controlling type having a travelling printing head, a stream of ink is sent under pressure from a reservoir 16 to a nozzle 10 by a pump 12 and excited by an ultrasonic vibrator 14 so that ink droplets 18 of a frequency equal to the exciting signal frequency are ejected from the nozzle 10. Excitation of the ultrasonic vibrator 14 is provided by a master oscillator circuit 20. The signals from the master oscillator circuit 20 are also applied to a video generator 22 which in turn supplies charging signals (video signals) corresponding to input signals 24 to a charging electrode 26.

As the ink droplets 180 charged with the charging signals pass over a high-voltage electric field established by a pair of high-voltage deflection plates 280, 282, they are deflected in accordance with the amplitude of charges on the droplets and directed toward a recording paper 30. The ink droplets 182 not contributing to wiring operation are not charged and conducted to a beam gutter 32 for recirculation.

FIG. 5 shows a typical circuit construction of the video generator 22. A row counter 34 comprises three flip-flops and functions as a counter of radix 7. The row counter 34 is connected to receive the output signals from the master oscillator circuit 20, whereby the counting operation in the row counter 34 is synchronized with the ink droplet formation. A column counter 36 comprises four flip-flops and functions as a counter of radix 9. The column counter 36 is connected to receive the output signal of the lowermost digit position of the row counter 34, whereby the column counter 36 performs the counting operation every completion of one cycle of the counting operation 0 through 6 in the row counter 34.

A first read only memory 38 stores coded character patterns corresponding to the primary matrix pattern of 5 × 7 structure shown in FIG. 1, whereas a second read only memory 40 stores coded character patterns corresponding to the auxiliary matrix pattern of 4 × 6 structure shown in FIG. 2. Both the read only memories 38 and 40 are connected to receive the lower three digit outputs of the column counter 36 through signal transmission wires 36*a*, 36*b* and 36*c* for address selection, whereby the column number as shown in FIGS. 1 and 2 is selected. In this example, the lower three digit positions of the column counter 36 form a counter of radix 5.

Both the read only memories 38 and 40 also receive the data input signals 24 for selecting a desired character pattern to be printed. The read only memories 38 and 40 develop output signals in a parallel fashion corresponding to the data input signals 24 and to the column number selected by the column counter 36, respectively. Since the first read only memory stores the character information of 5 × 7 matrix structure, the output signals of the first read only memory 38 are of 7 bits. Whereas, the output signals of the second read only memory 40 are of 6 bits since it stores the character information of 4 × 6 matrix structure.

First and second data selectors 42 and 44 receive the output signals of the first and second read only memories 38 and 40 in a parallel fashion, respectively, and develop output signals in a series fashion in synchronization with clock signals from the row counter 34.

FIG. 6 shows a typical circuit construction of the data selector 42. The data selector 42 mainly comprises three select terminals $S_0$, $S_1$ and $S_2$ respective of which are connected to signal transmission wires 34*a*, 34*b* and 34*c* associated with the row counter 34; input terminals $I_0$ through $I_6$ connected to the first read only memory 38; an output terminal Z for developing an output signal in a series fashion in synchronization with the clock signals from the row counter 34; and seven AND gates 420 through 426.

The operation mode of the data selector 42 will be appreciated by the following TABLE I.

TABLE I (TRUTH TABLE OF DATA SELECTOR -42-)

| INPUT | | | | | | | | | | OUTPUT |
|---|---|---|---|---|---|---|---|---|---|---|
| $S_2$ | $S_1$ | $S_0$ | $T_0$ | $I_1$ | $I_2$ | $I_3$ | $I_4$ | $I_5$ | $I_6$ | Z |
| 0 | 0 | 0 | 0 | X | X | X | X | X | X | 0 |
| 0 | 0 | 0 | 1 | X | X | X | X | X | X | 1 |
| 0 | 0 | 1 | X | 0 | X | X | X | X | X | 0 |
| 0 | 0 | 1 | X | 1 | X | X | X | X | X | 1 |
| 0 | 1 | 0 | X | X | 0 | X | X | X | X | 0 |
| 0 | 1 | 0 | X | X | 1 | X | X | X | X | 1 |
| 0 | 1 | 1 | X | X | X | 0 | X | X | X | 0 |
| 0 | 1 | 1 | X | X | X | 1 | X | X | X | 1 |
| 1 | 0 | 0 | X | X | X | X | 0 | X | X | 0 |
| 1 | 0 | 0 | X | X | X | X | 1 | X | X | 1 |
| 1 | 0 | 1 | X | X | X | X | X | 0 | X | 0 |
| 1 | 0 | 1 | X | X | X | X | X | 1 | X | 1 |
| 1 | 1 | 0 | X | X | X | X | X | X | 0 | 0 |
| 1 | 1 | 0 | X | X | X | X | X | X | 1 | 1 |

x : irrelevant

The data selector 42 can be made of HD2571 or HD2571P manufactured by Hitachi, Ltd., Japan. The data selector 44 can be of a same construction as the data selector 42 except the fact that the data selector 44 requires only six input terminals $I_0$ through $I_5$.

In this way, character information corresponding to the desired column in the dot matrix pattern, for example, the first columns 1*a* and 1*a*' of the dot matrix pattern shown in FIGS. 1 and 2, serially appears on signal transmission wires 42*a* and 44*a* connected to the Z terminals of the first and second data selectors 42 and 44, respectively. The first columns 1*a* and 1*a*' should be printed at the positions differing a half dot position in the lateral direction from each other as shown in FIG. 3.

A third data selector 46 receives the information on the signal transmission wires 42*a* and 44*a*, and then develops an output signal in response to a selection signal from the column counter 36. That is, the third data selector 46 firstly develops the information on the signal transmission wire 42*a* and secondly develops the information on the signal transmission wire 44*a*.

FIG. 7 shows a typical circuit construction of the third data selector 46. The data selector 46 mainly comprises input terminals $I_0$ and $I_1$ connected to the signal transmission wires 42*a* and 44*a* associated with the first and second data selectors 42 and 44, respectively; a selection terminal S connected to receive the uppermost output signal of the column counter 36 through a signal transmission wire 36*d*; an output terminal Z for developing the output signal in response to the selection signal from the column counter 36; and a pair of AND gates 460 and 461.

The operation mode of the data selector 46 will be appreciated by the following TABLE II.

TABLE II (TRUTH TABLE OF DATA SELECTOR -46-)

| SELECT | INPUT | | OUTPUT |
|---|---|---|---|
| S | $I_0$ | $I_1$ | Z |
| 1 | X | 0 | 0 |
| 1 | X | 1 | 1 |
| 0 | 0 | X | 0 |
| 0 | 1 | X | 1 |

X : irrelevant

The data selector 46 can be made of DM7123 or DM8123 manufactured by National Semiconductor Corporation.

The output signal of the third data selector 46 is applied to a charging voltage control circuit 48, which develops a video signal in response to the character information from the data selector 46 and in synchronization with the clock signals from the row counter 34 and the column counter 36.

FIG. 8 shows a typical circuit construction of the charging voltage control circuit 48, which comprises four NAND gates 50, 52, 54 and 56 respective of which are connected to receive clock signals from the row counter 34 and the column counter 36 via the signal transmission wires 34*a*, 34*b*, 34*c* and 36*d*, and to receive the output signal from the data selector 46 in common. The charging voltage control circuit 48 further comprises PNP transistors 58, 60, 62 and 64. Each emitter and base electrodes of the transistors 58, 60, 62 and 64 are connected to the output terminals of the NAND gates 50, 52, 54 and 56, and to a power supply terminal via resistors and a capacitor as shown in FIG. 8. Each collector of the transistors 58, 60, 62 and 64 is connected to an input terminal of an amplifier 66 via resistors 68, 70, 72 and 74, the resistance values of the respective resistors are in the ratio 1:2:3:4, for example, 2KΩ, 4KΩ, 8KΩ and 16KΩ.

The charging voltage control circuit 48 functions, in combination, as a D-A converter which develops an analogue signal in response to a coded row number derived from the row counter 34. That is, by applying the coded row signal and the information signal to the NAND gates 50, 52 and 54 from the row counter 34 and the data selector 46, the amplifier 66 develops the video signal of which amplitude corresponds to the row number on which the ink droplet should be deposited. The NAND gate 56, connected to receive the signal from the column counter 36 through the signal transmission wire 36*d*, functions to shift the ink droplet by a half dot position on the matrix pattern.

More specifically, the NAND gate 56 functions to increase the video signal amplitude by a half dot position when the data selector 46 develops the character information derived from the second data selector 44 associated with the auxiliary read only memory 40. With such an arrangement, the video signals corresponding to the adjacent two columns, for example, the first column 1*a* of the 5 × 7 matrix and the first column 1*a'* of the 4 × 6 matrix are different from each other by a half dot position, whereby the compound matrix pattern shown in FIG. 3 is formed.

Figure 9:
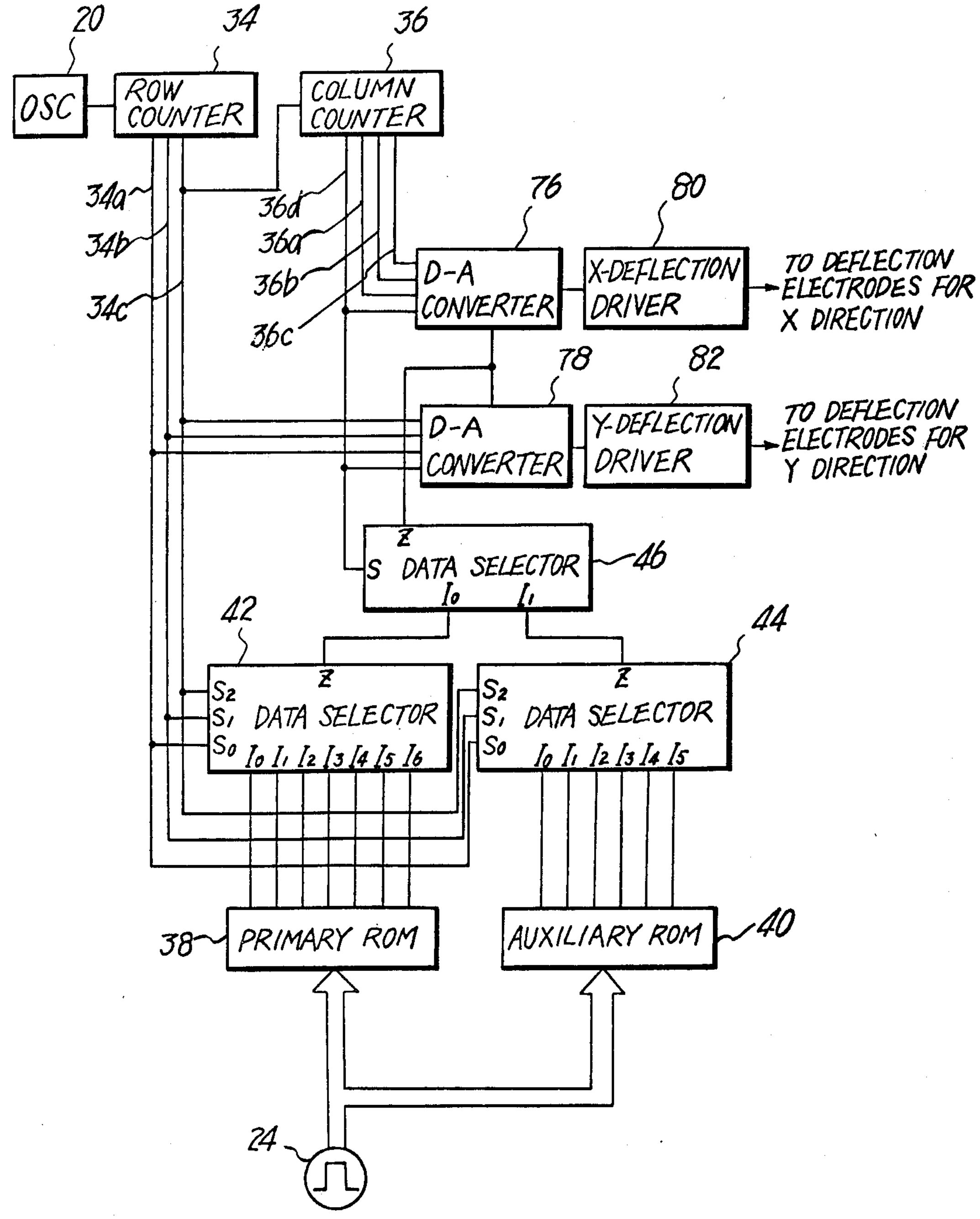
FIG. 9 is a circuit diagram of a video generator of the present invention for use in an ink jet system printer of the deflection voltage controlling type.

FIG. 9 shows a typical circuit construction of a video generator of the present invention for use in an ink jet system printer of the deflection voltage controlling type. Like elements corresponding to those of FIG. 5 are indicated by like numerals.

Two D-A converters 76 and 78 are provided, one for X-deflection and the other for Y-deflection. The D-A converter 76 is clocked by the signals from the column counter 36 and the D-A converter 78 is clocked by the signals from the row counter 34. Output signals of the D-A converter 76 are applied to deflection electordes affording the deflection in the X direction through an X-deflection driver 80, whereas output signals of the D-A converter 78 are applied to deflection electrodes affording to deflection in the Y direction through a Y-deflection driver 82. The D-A converters 76 and 78, and the drivers 80 and 82 function, in combination, in a same manner as the charging voltage control circuit 48 of the video generator 22 shown in FIG. 5.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer of the charge amplitude controlling type wherein an ink stream emitted from a nozzle having an ultrasonic vibrator is broken into ink droplets of a uniform size at a given vibration frequency, and the individual ink droplets, charged by a charging electrode in accordance with a video signal generated from a video generator, are deflected in accordance with the amplitude of charges carried thereon as they pass through an electrostatic field of a fixed high voltage, thereby printing desired symbols on a recording medium in a dot matrix pattern, said video generator comprising:

first means for developing a first video signal for forming a primary matrix pattern;

second means for developing a second video signal for forming an auxiliary matrix pattern; and third means for alternatively supplying the first video signal and the second video signal to the charging electrode, wherein auxiliary droplets charged by the second video signal are deposited on the positions where primary droplets charged by the first video signal are not deposited.

2. The ink jet system printer of claim 1, wherein the auxiliary droplets are shifted in both column and row directions by a half dot position with respect to the primary droplets.

3. The ink jet system printer of claim 2, wherein the primary matrix pattern is 5 × 7 structure and the auxiliary matrix pattern is 4 × 6 structure and wherein the auxiliary droplets are deposited between two adjacent primary droplets along oblique lines of the primary matrix pattern.

4. An ink jet system printer of the charge amplitude controlling type wherein an ink stream emitted from a nozzle having an ultrasonic vibrator is broken into ink droplets of a uniform size at a given vibration frequency, and the individual ink droplets, charged by a charging electrode in accordance with a video signal generated from a video generator, are deflected in accordance with the amplitude of charges carried thereon as they pass through an electrostatic field of a fixed high voltage, thereby printing desired symbols on a recording medium in a dot matrix pattern, said video generator comprising:

- a first read only memory for developing a first character signal for forming a primary matrix pattern in a parallel fashion;
- a second read only memory for developing a second character signal for forming an auxiliary matrix pattern in a parallel fashion;
- a first data selector connected to receive the first character signal from the first read only memory and developing a first information signal in a series fashion;
- a second data selector connected to receive the second character signal from the second read only memory and developing a second information signal in a series fashion; a third data selector connected to receive the first information signal and the second information signal and alternatively passing the first and second information signals; and
- a charging voltage control circuit for developing the video signal in accordance with an output signal from the third data selector, wherein auxiliary droplets charged by the video signal associated with the second information signal are shifted in both column and row directions by a half dot position on the recording medium with respect to primary droplets charged by the video signal associated with the first information signal.

5. The ink jet system printer of the charge amplitude controlling type of claim 4, which further comprises:

- a row counter for clocking the first and second data selectors, and the charging voltage control circuit; and
- a column counter for clocking the first and second read only memories, the third data selector, and the charging voltage control circuit.

6. The ink jet system printer of claim 5, wherein the row counter is of radix 7 and the column counter is of radix 9.

7. The ink jet system printer of claim 4, wherein the primary matrix pattern is 5 × 7 structure and the auxiliary matrix pattern is 4 × 6 structure.

8. The ink jet system printer of claim 4, wherein the charging voltage control circuit comprises a means for increasing the video signal level associated with the second information signal by a half dot position as compared with the video signal level associated with the first information signal.

* * * * *